Figure 4:
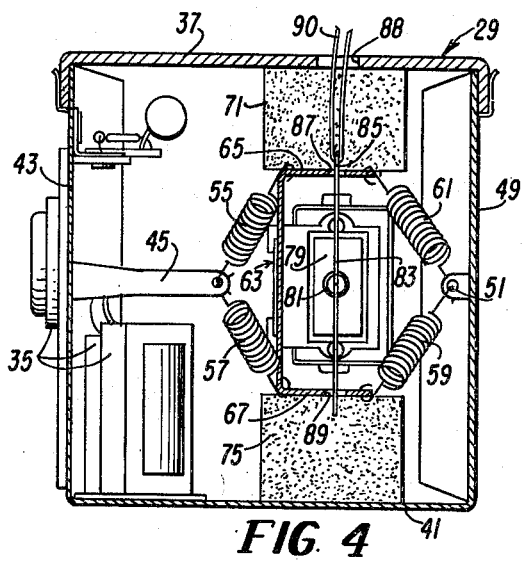

May 4, 1965  E. R. ZEISS  3,182,130
SHOCK MOUNTING
Filed March 12, 1963  2 Sheets-Sheet 1
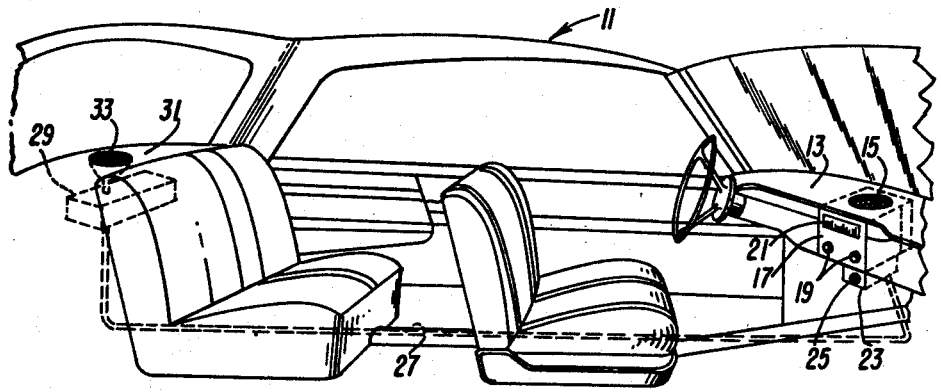
FIG. 1
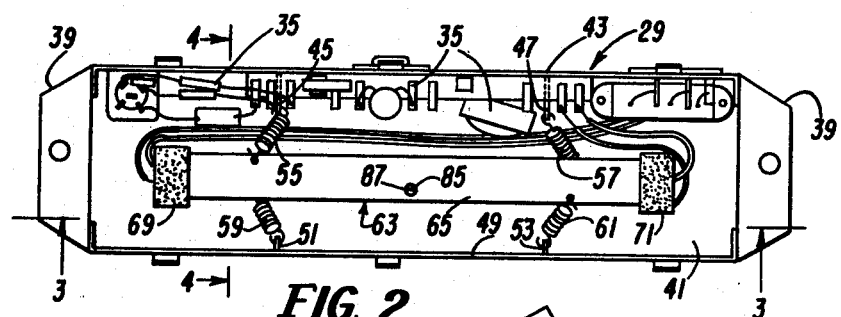
FIG. 2
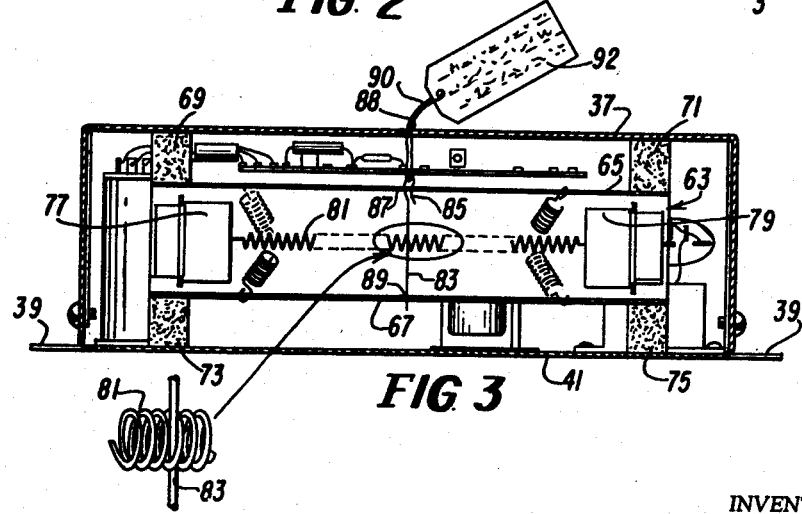
FIG. 3
FIG. 3a
INVENTOR.
Ernest R. Zeiss
BY
Mueller & Aichele
Attys.

United States Patent Office 3,182,130
Patented May 4, 1965

3,182,130
SHOCK MOUNTING
Ernest R. Zeiss, Lombard, Ill., assignor to Motorola, Inc., Franklin Park, Ill., a corporation of Illinois
Filed Mar. 12, 1963, Ser. No. 264,609
8 Claims. (Cl. 179—1)

This invention relates to sound reproduction systems, and more particularly to electromechanical reverberation devices and the mounting thereof for imparting a time delay and amplitude decay to signals passing therethrough.

It may be desirable, in certain sound reproduction systems, to impart a time delay and amplitude decay to some of the signals being reproduced to provide a reverberation effect. Such a feature can add depth and realism, under certain circumstances, to the audio signals being reproduced. This is especially true in automobiles where the passenger enclosure is small, and a subjective enlargement thereof, by utilizing reverberated signals, can greatly enhance sound reproduction.

Certain difficulties, however, may be encountered in utilizing a reverberation device for an automobile sound system. Known reverberation devices include input and output transducers with a vibration transmitting device, such as a spring or other delay mechanism, connecting the two. Electrical signals enter the input transducer and are converted to mechanical energy which is transmitted through the vibration transmitting device to the output transducer and reconverted to electrical energy. During the period of transmission in the vibration transmitting device, the signals are mechanically delayed and given a decaying amplitude. Accordingly, when they are reproduced, a result similar to that produced by sound in a large room, is obtained. Unfortunately, the extreme vibrations and shocks during the motion of an automobile may cause excessive vibrations of the vibration transmitting device which may result in damage and excessive noise. Similar damage could occur in the event that the apparatus began vibrating at its resonant frequency. Damage may also occur during shipping due to rough handling, and proper packing to prevent this involves time consuming and delicate packing and unpacking operations.

Accordingly, it is an object of this invention to provide a simple and improved mounting structure for a reverberation device for use in automobiles.

Another object of the invention is to provide a suspension system, for a reverberation device, which prevents shock damage and noise.

Still another object of the invention is to provide a suspension system for a reverberation device, which will damp out oscillations at the resonant frequency of the device.

It is another object of the invention to provide a shipping keeper which prevents shipping damage in a reverberation device with a minimum of protective packaging, and which may be easily installed and removed.

A feature of the invention is the provision of a reverberation device having an elongated frame supporting a pair of transducers and connecting vibration transmitter, with the frame in turn being resiliently suspended in a supporting enclosure, and with damping means at either end of the frame restraining movement of the frame with respect to the enclosure.

Another feature of the invention is the provision, in the above device, of a removable elongated member extending from the frame and engaging the vibration transmitter for preventing excessive vibration thereof during shipping.

Still another feature of the invention is the provision of a reverberation device with an elongated channel supporting the transducers and connecting vibration transmitter, with the channel being resiliently suspended in the supporting enclosure by springs disposed to have opposing tensional forces, and of the further provision of foam damping pads at either end of the channel and compressed between the channel and the top and bottom of the enclosure.

Figure 5:
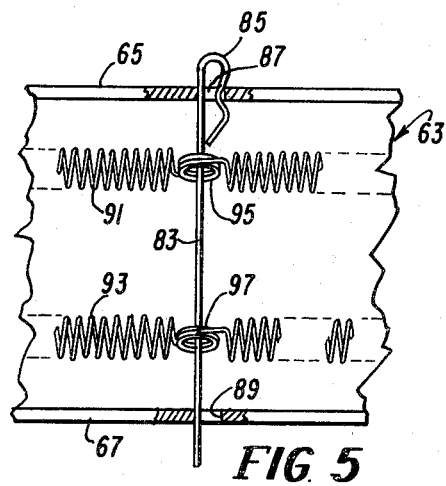
Figure 6:
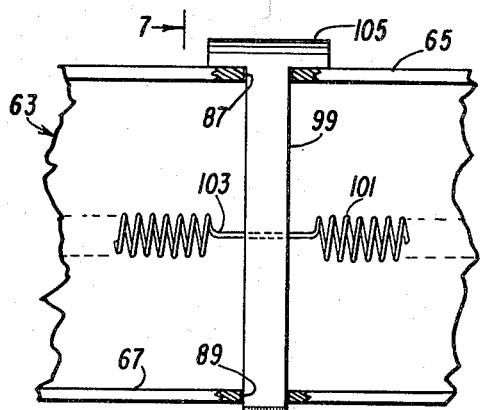
Figure 7:
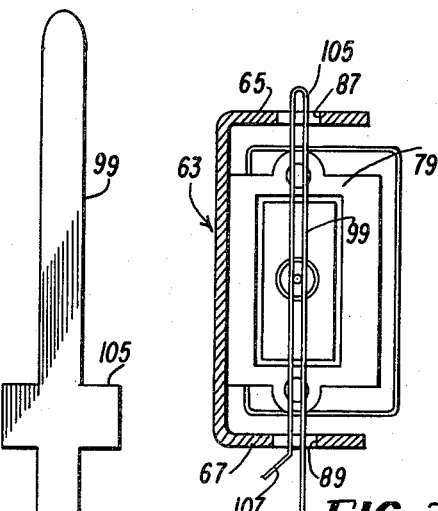
Figure 9:
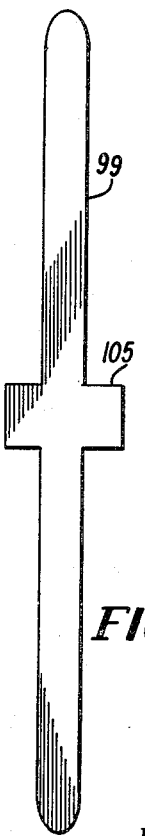
Figure 8:
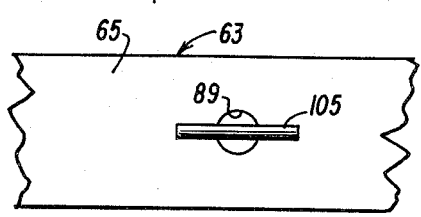

In the drawing:
FIG. 1 is a schematic view of the interior of an automobile utilizing a sound reproduction system incorporating the reverberation apparatus of the invention;
FIG. 2 is a top plan view of a reverberation device constructed in accordance with the invention;
FIG. 3 is a sectional view taken along the line 3—3 of FIG. 2;
FIG. 3a is an enlarged view of a broken away section of the device of FIG. 3;
FIG. 4 is an enlarged sectional view taken along the line 4—4 of FIG. 2;
FIG. 5 is a sectional view illustrating an alternative embodiment of the invention;
FIG. 6 is a sectional view illustrating another type of shipping keeper in accordance with the invention;
FIG. 7 is a sectional view taken along the line 7—7 of FIG. 6;
FIG. 8 is a top plan view of the device of FIG. 6; and
FIG. 9 is a plan view of the shipping keeper shown in FIGS. 6 through 8 as it appears unfolded.

In practicing the invention an elongated channel for supporting the components of the reverberation device is suspended in an enclosure by means of four springs. The springs are attached to points intermediate the ends of the channel and are connected to the enclosure to be disposed such that their tensional forces are in opposition. A plurality of foam damping pads are located at each end of the channel and are compressed between the top and bottom of the channel and the top and bottom of the enclosure to provide a damping effect. The reverberation device, which includes a pair of transducers connected by a vibration transmitting spring or similar member, is provided with an elongated shipping keeper which extends through holes in the top and bottom of the channel. This shipping keeper engages the spring and secures the same against excessive vibration during shipping. The shipping keeper may consist of a single strand of spring wire inserted through a loop in the spring or springs, or it may consist of a double fold of fiber board which passes on either side of the spring to limit the vibration thereof.

Referring now to FIG. 1, the interior of an automobile 11 is shown having a dash panel 13 beneath which is mounted a front speaker 15. A radio receiver 17, having controls 19 and indicator dial 21 is mounted in dash panel 13. A portion of the signals from radio receiver 19 is fed to the front speaker 15, and a portion is fed to a rear speaker control 23 mounted beneath receiver 17 and controlled by knob 25. Connection is made from control 23 through a cable 27, run beneath the floor boards of the automobile, to a component supporting enclosure 29. Enclosure 29 may be mounted as shown, beneath the rear shelf 31 in the trunk of automobile 11, or may be mounted in any other convenient position proximate the rear of the automobile. A rear speaker 33 is mounted in rear shelf 31 and is connected to the components in component supporting enclosure 29, as will be explained.

In FIGS. 2 through 4, the details of the components mounted in enclosure 29 may be clearly seen. In the particular form of the invention shown, enclosure 29 also serves to enclose an amplifier for rear speaker 33. The components of the amplifier are indicated generally at 35, mounted along one wall of the enclosure 29. In FIG.

2 it should be noted that the cover member 37 for enclosure 29, which covers the top and ends of the enclosure, is removed. Enclosure 29 includes a pair of flanges 39, for mounting purposes, extending at either end of the bottom portion 41.

The reverberation device itself is suspended within enclosure 29. Side portion 43 of enclosure 29 has a pair of extensions 45 and 47 extending inwardly therefrom, and side 49 has a pair of extensions 51 and 53 extending inwardly therefrom. Springs 55, 57, 59 and 61 each have one end fixed to an extension 45, 47, 51 and 53 respectively. Channel 63 supporting the reverberation device has a top flange 65 and a bottom flange 67, to which the other ends of springs 55, 57, 59 and 61 are attached. As may be seen from the drawings, the springs are attached to be angled slightly outwardly toward the ends of channel 63 and are so arranged as to have opposing tensional forces. That is, springs 55 and 59 will oppose springs 57 and 61 in the longitudinal direction of channel 63. In addition, springs 55 and 61 oppose springs 57 and 59 in the transverse direction of channel 63. The moment applied to channel 63 by springs 55 and 59 is directly opposed by the moment applied to channel 63 by springs 57 and 61. The springs are placed under slight tension to resiliently suspend channel 63 within enclosure 29.

Four damping pads of foam material 69, 71, 73, and 75 are mounted at either end of channel 63, to be compressed between the channel and the top 37 and bottom 41 of enclosure 29. The pads may be glued to the channel, taped thereto with double sided tape, or secured by some other similar arrangement. The components of the reverberation device mounted in channel 63 include an input transducer 77, an output transducer 79 and a vibration transmitter 81 connecting the two. In the device shown, the vibration transmitter is a precision wound steel spring. The input transducer receives the electrical signal from the radio output transformer and converts it into mechanical rotary motion. The motion is transmitted axially via the spring, which introduces a delay and a decaying amplitude, to the output transducer where it is reconverted into an electrical signal. The signal from the output transducer is then applied to the amplifier and reproduced at the rear speaker.

The resilient mounting of channel 63 by the springs, together with the damping effect of the pads, serves to substantially reduce vibrations normally encountered in the driving of an automobile. This arrangement further serves to absorb vibrations at the resonant frequency of the device. As a result, the unit functions properly under all conditions normally encountered during the motion of an automobile to provide high quality reverberated sound.

During shipping, extreme shocks may be encountered by the unit. Such a shock could set up sufficient vibration in spring 81 to damage the connection between the spring and the transducers 77 and 79. Accordingly, a shipping keeper is used to prevent excessive displacement of the spring. The keeper shown in FIGS. 2 through 4 comprises a single wire 83 with a clip portion 85 at one end. The wire is inserted through a hole 87 in the top 65 of channel 63, through a loop in the spring 81 (see FIG. 3a), and through a hole 89 in bottom 67 of the channel. Wire 87 will prevent excessive movement of the spring 81. A hole 88 is provided in the cover member 37 of enclosure 29, and if at the time wire 83 is inserted a string is attached to clip portion 85, the wire may be easily removed after shipping to place the unit in operative condition. The string is indicated at 90 in FIG. 3, and a direction tag 92 may be attached thereto.

Referring now to FIG. 5, an alternative embodiment of the invention is shown. Here two springs 91 and 93 are used and each spring is broken into two segments joined by a loop, 95 and 97 respectively. Wire 83 is inserted through holes 87 and 89 and through each of loops 95 and 97 to secure springs 91 and 93 against vibration. Removal may be accomplished in the same way as shown in FIG. 3.

Another type of shipping keeper which may be used as part of the invention is shown by FIGS. 6 through 9. Here a piece of fiber board 99, or similar material, is cut to the form shown in FIG. 9, and then folded double. The spring 101 of the reverberation device has a straight portion 103. Fiber board 99 is inserted through the top and bottom channel 63 to pass on either side of portion 103 and thereby secure the spring 101 in place. The top of fiber board 99 is widened at 105 and the opposite end may be bent, for example at 107, to secure the shipping keeper in place. This fiber board keeper may be used to restrain movement of a spring, by being placed on either side of the spring without the need for a straight portion therein.

It may therefore be seen that the invention provides a simple and effective mounting structure for a reverberation device which is used in an automobile, and which incorporates a suspension system which absorbs shock from the movement of the automobile and from resonant vibration. The device further incorporates a shipping keeper which will prevent damage during shipping and yet which may be readily removed to place the reverberation unit in an operative condition.

I claim:

1. A mounting structure for an electromechanical reverberation device which imparts time delay and amplitude decay to electrical signals passing therethrough, and which includes a frame member, said mounting structure including in combination, a supporting enclosure, a plurality of springs connecting the frame member to said supporting enclosure and suspending the frame therein, said springs being arranged to have mutually opposed tensional forces in all directions, thereby applying a resilient bias to displacement of said frame member due to external forces, and damping means between the frame member and said supporting enclosure at the ends of the frame member, said damping means engaging both the frame member and said supporting enclosure to damp vibrations of the frame member within said supporting enclosure and prevent excessive vibration thereof.

2. A mounting structure for a reverberation device which imparts time delay and amplitude decay to electrical signals passing therethrough and which includes an elongated frame member, said mounting structure including in combination, a supporting enclosure, a plurality of springs connecting said frame member to said supporting enclosure and suspending said frame member therein, said springs being arranged to have mutually opposed tensional forces in all directions, thereby applying a resilent bias to displacement of said frame member due to external forces, and damping foam mounted between said frame member and said supporting enclosure at the ends of said frame member, said damping foam engaging both said frame member and said supporting enclosure and compressed therebetween to damp vibrations of said frame member within said supporting enclosure and prevent excessive vibration of said vibration transmitting means.

3. A mounting structure for a reverberation device which imparts time delay and amplitude decay to electrical signals passing therethrough and which includes an elongated frame member and is for use in a vehicle and is subject to vibration and shock, said mounting structure including in combination, a supporting enclosure, a plurality of springs connecting said frame member to said supporting enclosure and suspending said frame member therein, said springs being arranged to have mutually opposed tensional forces in all directions, thereby applying a resilient bias to displacement of said frame member due to external forces, and damping pads between said channel member and said supporting enclosure at the ends of said channel member, said damping pads engaging both said channel member and said supporting enclosure and compressed therebetween to damp vibrations of said channel member within said supporting enclosure and to prevent excessive vibration of said spring means.

4. Supporting means for a reverberation device which imparts time delay and amplitude decay to electrical signals passing therethrough and which includes a reverberation device supported by an elongated frame member of substantially rectangular cross-section which device imparts time delay and amplitude decay to signals passing therethrough and which is for use in a vehicle and is subject to vibration and shock, said supporting means including in combination, an enclosure having side, top and bottom enclosing portions, first and second coil springs connecting respective points near the top of said frame member which are toward opposite sides and opposite ends of the frame member to said side enclosing portions of said supporting enclosure, third and fourth coil springs connecting respective points near the bottom of said frame member which are toward opposite sides and opposite ends of the frame member to said side enclosing portions of said supporting enclosure, said coil springs suspending the channel member in said supporting enclosure and being arranged to have mutually opposed tensional forces in all directions, thereby applying a resilient bias to displacement of said frame member due to external forces, four foam damping pads disposed between said top and bottom enclosing portions of said supporting enclosure and the top and bottom of the channel member, said damping pads being located in pairs at respective ends of the channel member, said foam pads engaging both the channel member and the top and bottom portions of said supporting enclosure and compressed therebetween to damp vibrations of the channel member within said supporting enclosure and prevent excessive vibration of said spring means.

5. Reverberation apparatus for use in a vehicle and which may be subject to vibration and shock during shipping prior to installation in a vehicle, including in combination, a supporting structure, an elongated channel member, input and output transducer means fixed to said channel member at opposite ends thereof, coil spring means transmitting vibration and connected between said input and output transducer means, said spring means mechanically imparting time delay and amplitude decay to signals passing therethrough between said input and output transducer means, a plurality of springs connecting said channel member to said supporting enclosure and suspending said channel member therein, said springs being arranged to have mutually opposed tensional forces in all directions, thereby applying a resilient bias to displacement of said frame member due to external forces, foam damping pads between said channel member and said supporting enclosure at the ends of said channel member, said damping pads engaging both said channel member and said supporting enclosure and compressed therebetween to damp vibrations of said channel member within said supporting enclosure and to prevent excessive vibration of said spring means, and a shipping keeper comprising an elongated member removably secured to said channel member and passing therethrough and engaging said spring means to prevent excessive vibrational movement thereof, said shipping keeper being manually removable from said channel member and said spring means.

6. Reverberation apparatus for use in a vehicle and which may be subject to vibration and shock during shipping prior to installation in a vehicle, including in combination, a supporting enclosure, a channel member containing vibration transmitting coil spring means therein and being resiliently suspended within said enclosure, an opening formed in said channel member, a wire member extending through said opening and through a coil of said spring means, said wire member having a clip formed at one end thereof and removably securing the same in said opening, said wire member preventing excessive vibrational movement of said spring means and being manually removable from said channel member and the coil of said spring means.

7. Reverberation apparatus for use in a vehicle and which may be subject to vibration and shock during shipping prior to installation in a vehicle, including in combination, a supporting enclosure, a channel member resiliently suspended therein and containing a pair of dual section springs, a pair of loops formed in said springs and joining the respective sections thereof, an opening formed in said channel member, a wire member extending through said opening in said channel member and through each of said loops in said springs, said wire member having a clip portion formed at one end thereof and securing same in said opening, said wire member preventing excessive vibrational movement of said springs and further being manually removable from said channel member and said springs.

8. Reverberation apparatus for use in a vehicle and which may be subject to vibration and shock during shipping prior to installation in a vehicle, including in combination, a supporting structure, a channel member resiliently suspended within said supporting structure and containing a vibration transmitting spring therein, an opening formed in said channel member, an elongated flattened member folded double and disposed through said opening in said channel member, said elongated member being disposed on either side of said spring for preventing excessive vibration thereof and being manually removable from said channel member and said spring.

References Cited by the Examiner
UNITED STATES PATENTS

| | | | |
|---|---|---|---|
| 1,597,120 | 6/26 | Haddock | 248—358.1 |
| 1,786,758 | 12/30 | Larson | 248—358 X |
| 2,375,004 | 5/45 | Knowles. | |
| 2,437,445 | 3/48 | Stack | 333—30 |
| 3,037,414 | 6/62 | Meinema. | |
| 3,106,610 | 10/63 | Young. | |

LEO SMILOW, *Primary Examiner.*